(12) United States Patent
Mizunaga et al.

(10) Patent No.: US 9,610,514 B2
(45) Date of Patent: *Apr. 4, 2017

(54) TRAVELING TOY WHEEL

(71) Applicant: K.I.T. CO., LTD., Kasugai-shi, Aichi (JP)

(72) Inventors: Atsushi Mizunaga, Kasugai (JP); Motokazu Ando, Kasugai (JP)

(73) Assignee: K.I.T. CO., LTD., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/781,029

(22) PCT Filed: Jan. 20, 2014

(86) PCT No.: PCT/JP2014/050952
§ 371 (c)(1),
(2) Date: Sep. 28, 2015

(87) PCT Pub. No.: WO2014/156237
PCT Pub. Date: Oct. 2, 2014

(65) Prior Publication Data
US 2016/0038845 A1  Feb. 11, 2016

(30) Foreign Application Priority Data

Mar. 29, 2013  (JP) ................... 2013-074325

(51) Int. Cl.
*A63H 17/26* (2006.01)
*B60B 3/00* (2006.01)
*B60B 37/00* (2006.01)

(52) U.S. Cl.
CPC ........... *A63H 17/262* (2013.01); *B60B 3/001* (2013.01); *B60B 37/00* (2013.01)

(58) Field of Classification Search
CPC .... B60B 7/04; B60B 3/00; B60B 3/08; B60B 3/082; B60B 3/10; A63H 17/262;
(Continued)

(56) References Cited

U.S. PATENT DOCUMENTS 2,646,315 A * 7/1953 Richard ................ B60B 25/16
152/413
3,048,447 A * 8/1962 Klint .................... A63H 17/262
152/323
(Continued)

FOREIGN PATENT DOCUMENTS

JP  61-203097 U  12/1986
JP  63-284001 A  11/1988
(Continued)

OTHER PUBLICATIONS

International Search Report dated Feb. 10, 2014, which was issued in corresponding International Application No. PCT/JP2014/050952.

*Primary Examiner* — Aarti B Berdichevsky
*Assistant Examiner* — Urszula M Cegielnik
(74) *Attorney, Agent, or Firm* — McDermott Will & Emery LLP

(57) ABSTRACT

A traveling toy wheel whose simple configuration allows multiple devices to be enjoyed and can further change fine offsets is provided. The traveling toy wheel includes a first rim member to which a tire is mounted and a second rim member which includes a fitting portion into which a wheel hub of a traveling toy is fitted. Fitting holes as fixing portions are provided in one of the first rim member or the second rim member and elastic convex pieces as fixed portions are provided in the other of the first and second rim members. When the elastic convex pieces are fitted in the fitting holes, the first rim member and the second rim member are jointed (Continued)

relatively unmovably. A plurality of fitting holes are arranged at different positions, so that it is possible to easily adjust an offset of the wheel.

2 Claims, 2 Drawing Sheets

(58) Field of Classification Search
 CPC ......... Y10T 403/7026; Y10T 403/7031; Y10T 403/7032; Y10T 403/7033; Y10T 403/7035
 See application file for complete search history.

(56) References Cited

U.S. PATENT DOCUMENTS

| | | | | |
|---|---|---|---|---|
| 3,638,356 A * | 2/1972 | La Branche | ......... | A63H 17/262 301/1 |
| 3,733,742 A * | 5/1973 | Terzian | ................. | A63H 29/20 446/429 |
| 4,900,095 A * | 2/1990 | Brubaker | ............. | A63H 17/262 152/396 |
| 6,632,121 B2 * | 10/2003 | Edmisson | ............ | A63H 17/262 446/469 |
| 6,913,507 B2 * | 7/2005 | Hui | ......................... | A63H 30/00 446/429 |
| 6,945,840 B2 * | 9/2005 | Hui | ...................... | A63H 17/262 446/465 |
| 7,014,272 B1 * | 3/2006 | Williamson | ......... | A63H 17/262 301/5.1 |
| 7,288,917 B2 * | 10/2007 | Art | ........................ | H02J 7/0047 320/107 |
| 7,651,171 B2 * | 1/2010 | Kinslow | ................... | B60B 7/10 301/108.1 |
| 2006/0079150 A1 * | 4/2006 | Filoseta | ................. | A63H 17/26 446/431 |
| 2006/0246829 A1 * | 11/2006 | Wentworth | .............. | B24D 5/06 451/455 |

FOREIGN PATENT DOCUMENTS

| | | |
|---|---|---|
| JP | H09-220903 A | 8/1997 |
| JP | 2004-131035 A | 4/2004 |
| JP | 3120385 U | 3/2006 |
| JP | 2010-524560 A | 7/2010 |
| JP | 3177538 U | 8/2012 |

* cited by examiner

TRAVELING TOY WHEEL

CROSS-REFERENCE TO RELATED APPLICATIONS

This application is the U.S. National Phase of PCT/JP2014/050952 filed Jan. 20, 2014, which claims priority to Japanese Patent Application No. 2013-074325 filed Mar. 29, 2013. The subject matter of each is incorporated herein by reference in entirety.

TECHNICAL FIELD

The present invention relates to a wheel for a traveling toy.

BACKGROUND ART

Generally, wheels conventionally used for a traveling toy (e.g. a radio control car) are molded in one piece, respectively. Hence, when so-called offset adjustment needs to be performed, a plurality of wheels of different offset values need to be selected according to a situation to exchange.

However, a user needs to possess a plurality of wheels according to a situation, and therefore there is a problem that possessing the wheels is costly and a storage space for the wheels needs to be secured. Meanwhile, a manufacturer side needs to individually manufacture wheels of different offsets, and therefore there is a problem that a plurality of molds are individually required and manufacturing cost steeply rises. Further, distributors have a problem that a sales space and a storage space become too large.

Further, Patent Document 1 discloses traveling toy wheels. According to a configuration disclosed in Patent Document 1, a design member is attachable to both surfaces of each wheel, and, only by preparing design members of a plurality of designs, it is possible to attach different design members to the same wheel main body.

Patent Document

Patent Document 1: JP-Y-3177538

DISCLOSURE OF THE INVENTION

Problem to be Solved by the Invention

However, even when a nice design is applied to a design member of each wheel disclosed in Patent Document 1, a partitioning portion of the wheel main body can be seen through a gap of the design member, and therefore a design is not necessarily good. Further, in case of these wheels, there is a limitation that one wheel is positive offset and the other one is negative offset. Therefore, only two types of these offsets can be used, and, when two types of +1 mm positive offset and +3 mm positive offset need to be selectively used, two types of wheels need to be individually manufactured, distributed and purchased.

It is therefore an object of the present invention to provide a traveling toy wheel whose simple configuration allows multiple designs to be enjoyed and whose one type of a design allows a change of fine offsets.

Means for Solving the Problem and Effect of the Invention

The present invention is addressed to a traveling toy wheel characterized by including:

a first rim member to which a tire is mounted; and
a second rim member having one end surface on which a design surface is formed,
wherein
a fixing portion is provided in a circumferential surface of the first rim member,
a fixed portion is provided in a circumferential surface of the second rim member,
the second rim member is inserted in the first rim member such that center axes of the first and second rim members match, and the fixing portion and the fixed portion face each other and are fixed relatively unmovably to joint the first rim member and the second rim member,
one of the fixing portion and the fixed portion is formed as a fitting hole formed in the circumferential surface of one of the first and second rim members,
the other of the fixing portion and the fixed portion is formed in the circumferential surface of the other of the first and second rim members, and is formed as an elastic convex piece which can fit into and engage with the fitting hole,
when the second rim member is inserted in the first rim member, the elastic convex piece comes into contact with the circumferential surface of one of the first and second rim members and elastically deforms while the second rim member is pushed to fit into the first rim member, and the elastic deformation of the elastic convex piece is entirely or partially released at a position at which the elastic convex piece fits into and engages with the fitting hole, and the first rim member and the second rim member are jointed, and
a plurality of the fitting holes are provided at different positions in the one of the first and second rim members along a center axis direction thereof, and one of the plurality of fitting holes is selected and the elastic convex piece is fitted to the selected fitting hole to allow relative positions of the first rim member and the second rim member to change in a wheel axis direction.

As described above, the traveling toy wheel according to the present invention is a so-called two-piece wheel formed by relatively inserting the second rim member in the first rim member, and adopts a structure that the fixing portions and the fixed portions are fixed relatively unmovably each other to joint the first rim member and the second rim member. When, for example, a user wants to change an external appearance of a wheel design surface (the user wants to use a wheel of a different design), the user needs to change only the second rim member to another rim member instead of changing an entire wheel. Consequently, users can substantially reduce purchase cost and a storage space. Further, the manufacturer side manufactures one type of a shape of the first rim member and manufactures multiple types of second rim members of different designs, and, consequently, can substantially suppress manufacturing cost such as development cost and molding cost compared to conventional wheels. Furthermore, distributors can save a sales space and a stock storage space compared to conventional wheels and, consequently, substantially reduce management cost. In view of such a situation, it is possible to reduce a goods price of the traveling toy wheel and select more flexibly wheels compared to conventional wheels.

Further, according to this configuration, the joint structure of the first rim member and the second rim member can secure the strength and becomes simple. Further, when the first rim member and the second rim member are separated, the elastic convex piece needs to be pulled out of the fitting hole by deflecting the elastic convex piece. Consequently, an operation of attaching and detaching the first rim member and the second rim member remarkably improves.

Further, according to this configuration, it is possible to flexibly select the fitting hole to which the elastic convex piece is fitted and set a plurality of offsets by using one type of a wheel. For example, one type of a wheel can set fine offsets such as positive offset +1 mm and positive offset +3 mm. A user having one first rim member which includes fitting holes which support desired offsets can purchase only the second rim member according to user's preference and change the offset. That is, although users conventionally need to have a plurality of whole wheels since offsets are different between wheels of the same design, the users need to have only one type of a wheel. Further, a manufacturer side does not need to individually manufacture wheels of different offsets for specific designs, and a distributor side does not need to secure a large sales space or stock storage space.

Further, a guide convex portion is provided so as to project from one of an inner circumferential surface of the first rim member and an outer circumferential surface of the second rim member, a guide concave groove which extends along a center axis of one of the first and second rim members and whose one groove end is opened at an end portion of one of the first and second rim members is provided in the other of the inner circumferential surface of the first rim member and the outer circumferential surface of the second rim member, and when the second rim member is inserted and fixed in the first rim member, the guide convex portion is inserted in the opened groove end of the guide concave groove, such that the guide convex portion and the guide concave groove can relatively slide while a surface of the guide convex portion and a surface of the guide concave groove contact each other.

According to this configuration, a guide concave groove guiding function can reliably and easily position the fixing portions and the fixed portions such that the fixing portions and the fixed portions face each other, so that it is possible to remarkably improve the operation of assembling the first rim member and the second rim member. Further, it is possible to prevent the first rim member and the second rim member from rattling in a rotation direction. Further, a plurality of aligned guide convex portions and guide concave grooves function as reinforcement ribs, so that it is possible to provide an advantage of improving the strength of each rim member.

Effect of Invention

The traveling toy wheel according to the present invention can change design aspects with a simple configuration and, consequently, can provide an effect of substantially reducing various types of cost. Further, the traveling toy wheel also provides an effect that one design allows a change of a plurality of fine offsets. Further, the traveling toy wheel provides an effect of allowing a user to easily change not only designs but also offsets.

BRIEF DESCRIPTION OF THE DRAWINGS

FIG. 1(a) is a perspective view, showing a first rim member and FIG. 1(b) is a perspective view, showing a second rim member.

BEST MODE FOR CARRYING OUT THE INVENTION

An embodiment for embodying a traveling toy wheel according to the present invention will be described later in detail. In addition, the present invention is not limited to the following embodiment, and a design change can be optionally made.

Embodiment 1

Figure 1:
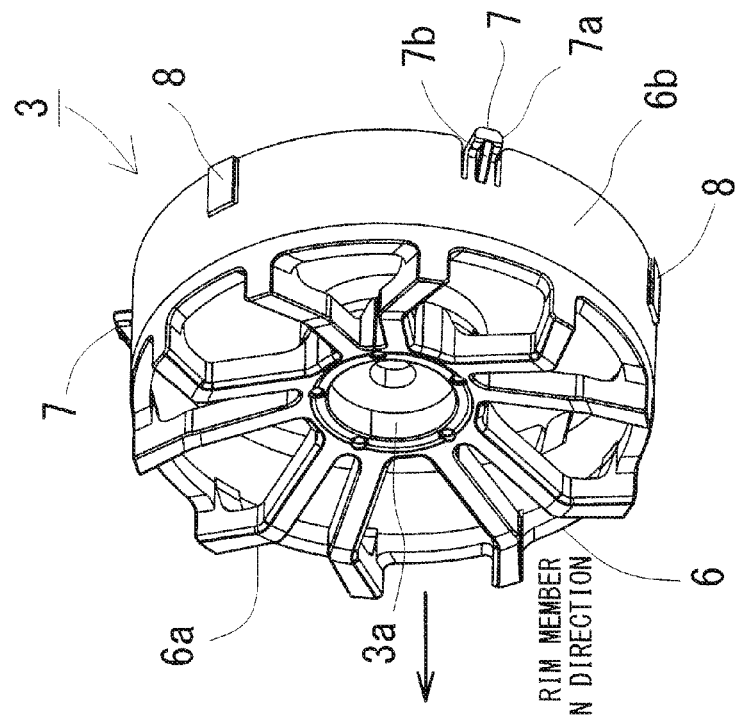
FIG. 1 shows a wheel according to an embodiment of the present invention.
Figure 1:
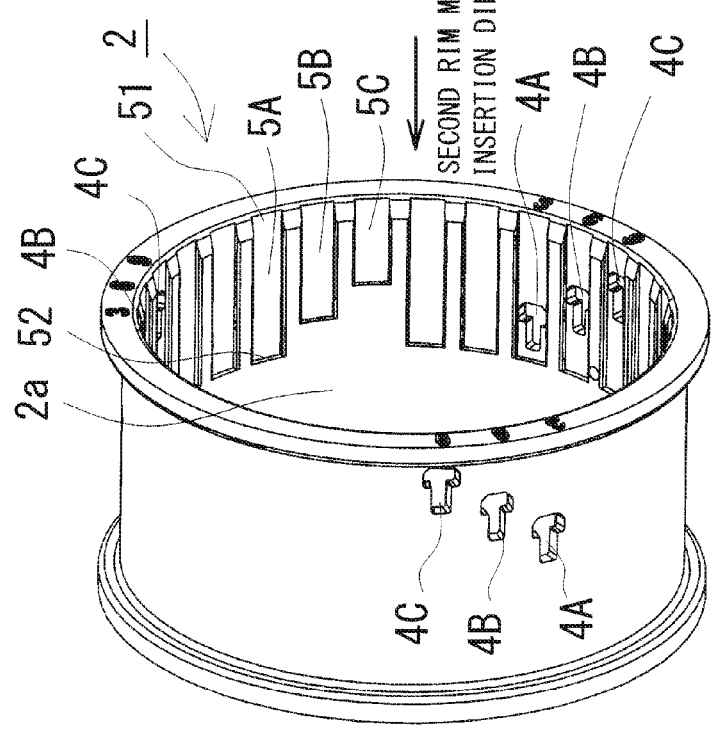
Figure 2:
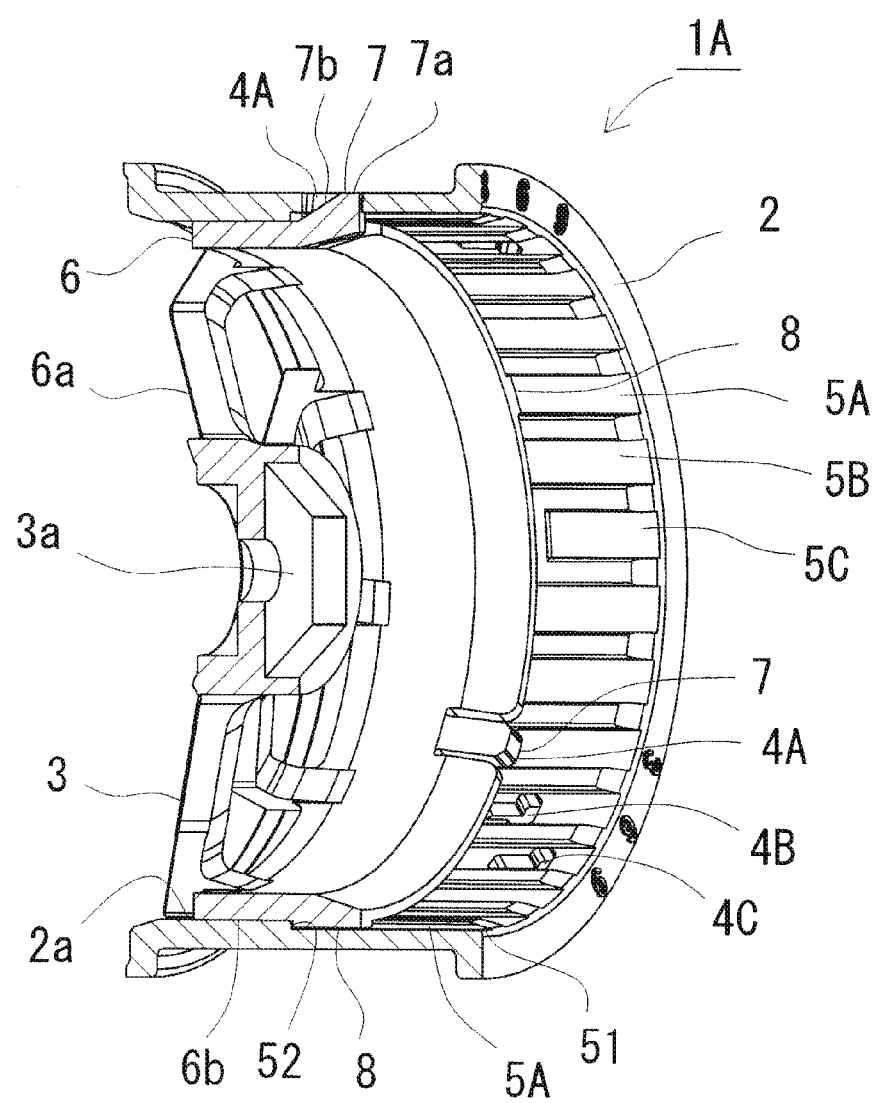
FIG. 2 is a partial cross-sectional perspective view according to the embodiment.

FIGS. 1 and 2 show a wheel 1 according to the present embodiment. As shown in FIG. 1, the wheel 1 includes a first rim member 2 of a nearly cylindrical shape to which a tire (not shown) is mounted, and a second rim member 3 that is inserted and fixed in the first rim member 2. In addition, the outer diameter of the second rim member 3 is set according to the inner diameter of the first rim member 2 such that the second rim member 3 can be inserted and fixed in the first rim member 2. Further, the rim width of the first rim member 2 is set wider than that of the second rim member 3.

As shown in FIG. 1(a), in a circumferential surface of the first rim member 2, fitting through-holes 4 (4A to 4C) are formed as fixing portions. More specifically, each fitting hole 4 is formed in a nearly T shape when seen from a front, and the three fitting holes 4 (4A to 4C) forms one set. Three sets in total are disposed along a circumferential direction of the first rim member 2. Further, each of the fitting holes 4A, 4B and 4C is arranged at a position shifted by 3 mm from each other along a center axis direction of the first rim member 2, and is arranged by being shifted from each other in the circumferential direction, too. Furthermore, at positions near these fitting holes 4, offset reference markings A, B and C are engraved corresponding to the fitting holes 4 in a circumferential end surface on a vehicle body side of the wheel 1.

Further, in the inner circumferential surface 2a of the first rim member 2, guide concave grooves 5 (5A, 5B and 5C) each of which extends along the center axis of the first rim member 2 are formed. Furthermore, each guide concave groove 5 includes one groove end as an opening 51 which is positioned on the vehicle body side of the first rim member 2 and which is opened, and the other groove end as an end 52 which is a design surface side and is arranged at a position close to the center of the first rim member 2. In addition, the three guide concave grooves 5 (5A, 5B and 5C) aligned in the circumferential direction are disposed as one set of the guide concave grooves 5, and positions of the ends 52 are varied by 3 mm such that the guide concave grooves 5 (5A, 5B and 5C) meet the fitting holes 4 (4A to 4C). In addition, three sets of the guide concave grooves 5 (5A, 5B and 5C) in total are provided along the circumferential direction of the first rim member 2.

Further, as shown in FIG. 1(b), the second rim member 3 is composed of a disk body 6 formed with a fitting portion 3a into which a wheel hub (not shown) formed in a traveling toy body is fitted. Further, a front side end surface of the disk body 6 is a design surface 6a having a design. Further, in an outer circumferential surface 6b of the disk body 6, elastic convex pieces 7 as fixed portions are provided so as to project along a radial direction of the second rim member 3. Further, each elastic convex piece 7 includes a claw portion 7a of a flat shape and a tapered rib 7b whose height gradually lowers toward the design surface 6a side from the claw portion 7a, and can fit into and engage with each fitting hole 4. In addition, the three elastic convex pieces 7 are disposed at equal intervals to meet the sets of the fitting holes 4 of the first rim member 2.

Further, in the outer circumferential surface 6b of the second rim member 3, guide convex portions 8 are provided so as to project along the radial direction of the second rim member 3. The three guide convex portions 8 are disposed at equal intervals in the circumferential direction of the second rim member 3 to meet the sets of the guide concave grooves 5 of the first rim member 2.

Next, with reference to FIG. 2, a process of assembling the first rim member 2 and the second rim member 3 will be described. A center axis of the first rim member 2 and a center axis of the second rim member 3 are matched, the second rim member 3 is pushed to fit into the first rim member 2 and the elastic convex pieces 7 are fitted into the fitting holes 4 of the first rim member 2. In this case, by using engraved references indicating a desired offset reference A, for example, as markings, the elastic convex pieces 7 are positioned at the corresponding fitting holes 4A and the guide convex portions 8 of the second rim member 3 are inserted in the openings 51 which are the one groove ends of the guide concave grooves 5A of the first rim member 2 and are slid until the guide convex portions 8 hit the ends 52 by a guiding function of the guide concave grooves 5A. Thus, while the first rim member 2 and the second rim member 3 restrict relative movement of each other in a rotation direction, it is possible to very smoothly fit the elastic convex pieces 7 into the desired fitting holes 4.

In addition, when the second rim member 3 is inserted in the first rim member 2, the ribs 7b of the elastic convex pieces 7 of the second rim member 3 come into contact with the inner circumferential surface of the first rim member 2, and the elastic convex pieces 7 are elastically deformed inward. Further, when the elastic convex pieces 7 and the fitting holes 4 face each other and fit, elastic deformation of the elastic convex pieces 7 is partially released, and the fitting holes 4 and the elastic convex pieces 7 engage with each other. In addition, each fitting hole 4A is formed in a nearly T shape to meet shapes of the claw portion 7a and the rib 7b of the elastic convex piece 7, and operability for releasing engagement is also taken into account.

Further, as shown in FIG. 2, in a state where the elastic convex pieces 7 are fitted into the fitting holes 4A and the first rim member 2 and the second rim member 3 are jointed relatively unmovably, the guide convex portions 8 are in contact with the ends 52 of the guide concave grooves 5A. Hence, for example, it is possible to prevent that the first rim member 2 and the second rim member 3 cannot be adequately jointed if the elastic convex pieces 7 get over the fitting holes 4A. Further, surfaces of the guide convex portions 8 come into planar contact with the guide concave grooves 5 and come into contact with the ends 52, so that it is possible to prevent the first rim member 2 and the second rim member 3 from rattling forward, backward, leftward and rightward (including the rotation direction), and secure sufficient rigidity and durability of the wheel 1. Hence, this configuration is particularly effective when, for example, significant loads are applied to the wheel 1 from the front, the back, the left and the right upon drift driving of a radio control car.

Further, each elastic convex piece 7 is elastically deformed by using a pin or the like from an outside of the fitting hole 4A of the first rim member 2 and is pulled out of the fitting hole 4A to separate the first rim member 2 and the second rim member 3. Thus, the first rim member 2 and the second rim member 3 can be mutually unfixed and unjointed.

In this regard, when, for example, positive offset +3 mm needs to be changed to positive offset +6 mm, both of the rim members 2, 3 are separated once, and the elastic convex pieces 7 are fitted again in the fitting holes 4B instead of the fitting holes 4A. Similarly, when an offset needs to be changed to positive offset +9 mm, the elastic convex pieces 7 are fitted to the fitting holes 4C. Thus, in the present embodiment, one wheel 1 can support various types of offset values and relative positions of the first rim member 2 and the second rim member 3 can be optionally changed.

In addition, by reducing the rim width of the second rim member 3 by about ½ as in the above-described configuration according to the embodiment described above compared to a wheel width of a conventional configuration, it is possible to reduce the size of a mold for manufacturing the second rim member 3. Consequently, it is possible to remarkably reduce a rate of mold cost which occupies in wheel sales prices and provide products at reasonable prices to general users.

Further, when the different design surface 6a needs to be used, only the second rim member 3 needs to be changed to a different second rim member.

According to the present invention, the design can be optionally changed in addition to the embodiment. For example, through-holes may be formed as fixing portions and fixed portions in the circumferential surfaces of both of the rim members 2, 3, the through-holes which are fixed portions and the through-holes which are fixed portions may be caused to face each other and both of the rim members 2, 3 may be fixed unmovably by fastening means such as bolts and nuts. Further, in this case, each through-hole may be formed in an elongated slot whose longitudinal direction is along an axial direction of both of the rim members 2, 3 to enable stepless changes in relative positions of the rim members 2, 3. In addition, the fixing means may be an R pin, a roll pin or a cotter pin, and is not limited thereto as long as the fixing means can joint the first rim member 2 and the second rim member 3 relatively unmovably.

Further, the fixing portions and the fixed portions may be screw grooves engraved in the circumferential surfaces of both of the rim member 2, 3. That is, for example, the screw grooves are engraved in the inner circumferential surface of the first rim member 2 to cause the first rim member 2 to function as a female screw, and the screw grooves are engraved in the outer circumferential surface of the second rim member 3 to cause the second rim member 3 function as a male screw. Further, by matching the center axes of both of the rim members 2, 3 and screwing the entire second rim member 3 in the first rim member 2, it may be possible to fix the second rim member 3 at a desired position.

Further, the numbers and positions of fixing portions and fixed portions are not limited in particular. For example, the three fitting holes 4 (4A to 4C) are provided at three types of different positions in the above embodiment to fix the second rim member 3 to the first rim member 2. However, the four fitting holes 4 may be provided at four types of different positions to fix the second rim member 3. In addition, three or four positions at which the second rim member 3 can be fixed are provided, so that it is not necessary to possess three or four types of wheels of different offsets unlike conventional wheels. Consequently, it is possible to reduce a sales space or a storage space to about ⅓ or about ¼ according to the number of fitting holes 4 compared to conventional wheels.

Further, in the above embodiment, the fitting holes 4A, 4B and 4C are arranged by being shifted by 3 mm. However, naturally, the present invention is not limited to this, and can be designed such that desired values are optionally selected in a range of 2 mm to 4 mm.

Further, six sets of the elastic convex pieces 7 and the fitting holes 4 in total may be provided to each of the rim members 2, 3. According to this configuration, it is possible to further improve a joint strength of both of the rim members 2, 3. Further, from a standpoint of durability of the elastic convex pieces 7, the dimension may be set such that the shapes of the elastic convex pieces 7 restore to the original shape in a state where the elastic convex pieces 7 are fitted to the fitting holes 4.

Further, the numbers, positions or dimensional shapes of the guide concave grooves 5 and the guide convex portions 8 are not limited in particular. Further, the dimensional shapes of the first rim member 2 and the second rim member 3 are not limited in particular, either, and materials may be resin such as polyacetal (POM) resin or polyacrylic resin or metal such as stainless steel or aluminum as the case may be.

1: wheel
2: first rim member
3: second rim member
4: fitting hole (fixing portion)
5: guide convex groove
6a: design surface
7: elastic convex piece (fixed portion)
8: guide convex portion
51: opening

The invention claimed is:

1. A traveling toy wheel configured to support various types of offset values, comprising:
    a first rim member to which a tire is mounted; and
    a second rim member having one end surface on which design surface a design surface is formed, and a fitting portion into which a wheel hub of a traveling toy is fitted, wherein
    a fixing portion is provided in a circumferential surface of the first rim member;
    a fixed portion is provided in a circumferential surface of the second rim member;
    the second rim member is inserted in the first rim member such that center axes of the first and second rim members match, and the fixing portion and the fixed portion face each other and are fixed relatively unmovably to join the first rim member and the second rim member,
    one of the fixing portion and the fixed portion is formed as a fitting hole formed in the circumferential surface of one of the first and second rim members,
    the other of the fixing portion and the fixed portion is formed in the circumferential surface of the other of the first and second rim members, and is formed as an elastic convex piece which can fit into and engage with the fitting hole,
    when the second rim member is inserted in the first rim member, the elastic convex piece comes into contact with the circumferential surface of one of the first and second rim members and elastically deforms while the second rim member is pushed to fit into the first rim member, and the elastic deformation of the elastic convex piece is entirely or partially released at a position at which the elastic convex piece fits into and engages with the fitting hole, thereby jointing the first rim member and the second rim member, and
    a plurality of the fitting holes are provided at different positions in the one of the first and second rim members along a center axis direction thereof, and one of the plurality of the fitting holes is selected and the elastic convex piece is fitted to the selected fitting hole to allow relative positions of the first rim member and the second rim member to change in a wheel axis direction in order to change offset of the wheel.

2. The traveling toy wheel according to claim 1, wherein
    a guide convex portion is provided so as to project from one of an inner circumferential surface of the first rim member and an outer circumferential surface of the second rim member,
    a guide concave groove which extends along a center axis of one of the first and second rim members and whose one groove end is opened at an end portion of the one of the first and second rim members is provided in the other of the inner circumferential surface of the first rim member and the outer circumferential surface of the second rim member, and,
    when the second rim member is inserted and fixed in the first rim member, the guide convex portion is inserted in the opened groove end of the guide concave groove, such that the guide convex portion and the guide concave groove can relatively slide while a surface of the guide convex portion and a surface of the guide concave groove contact each other.

* * * * *